(12) United States Patent
Nomura et al.

(10) Patent No.: US 8,951,657 B2
(45) Date of Patent: Feb. 10, 2015

(54) BATTERY APPARATUS

(75) Inventors: Youjirou Nomura, Tokyo (JP); Kuniatsu Hachiya, Tokyo (JP); Toru Suzuki, Kanagawa (JP)

(73) Assignees: NEC Corporation, Tokyo (JP); NEC Energy Devices, Ltd., Kanagawa (JP)

( * ) Notice: Subject to any disclaimer, the term of this patent is extended or adjusted under 35 U.S.C. 154(b) by 74 days.

(21) Appl. No.: 13/818,031

(22) PCT Filed: Jun. 18, 2012

(86) PCT No.: PCT/JP2012/065487
§ 371 (c)(1),
(2), (4) Date: Feb. 20, 2013

(87) PCT Pub. No.: WO2013/011779
PCT Pub. Date: Jan. 24, 2013

(65) Prior Publication Data
US 2013/0288087 A1    Oct. 31, 2013

(30) Foreign Application Priority Data
Jul. 15, 2011   (JP) ................................. 2011-156889

(51) Int. Cl.
*H01M 10/38* (2006.01)
*H01M 2/10* (2006.01)
*H01M 10/613* (2014.01)
*H01M 10/627* (2014.01)
*H01M 10/63* (2014.01)
*H01M 10/6563* (2014.01)
*H01M 10/42* (2006.01)

(52) U.S. Cl.
CPC .......... *H01M 2/1016* (2013.01); *H01M 2/1077* (2013.01); *H01M 2/1094* (2013.01); *H01M 10/5004* (2013.01); *H01M 10/5018* (2013.01); *H01M 10/502* (2013.01); *H01M 10/5067* (2013.01); *H01M 2010/4271* (2013.01); *H01M 2220/10* (2013.01)
USPC ........... 429/123; 429/138; 429/149; 429/152; 429/153; 429/154; 429/163

(58) Field of Classification Search
CPC ............ H01M 10/42; H01M 10/5004; H01M 10/5067; H01M 2/1016; H01M 2/1022; H01M 2/1077; H01M 2/0217; H01M 2/0245; H01M 2/202; Y02E 60/12
USPC ............. 429/83, 99, 100, 123, 138, 142, 149, 429/152, 153, 154, 158, 160, 163, 185
See application file for complete search history.

(56) References Cited

U.S. PATENT DOCUMENTS

2005/0269995 A1* 12/2005 Donnelly et al. ............. 320/150
2012/0189888 A1*  7/2012 Wang et al. ..................... 429/94

FOREIGN PATENT DOCUMENTS

JP    2001-256934 A    9/2001
JP    2006-338934 A    12/2006

(Continued)

*Primary Examiner* — Patrick Ryan
*Assistant Examiner* — Ben Lewis
(74) *Attorney, Agent, or Firm* — Sughrue Mion, PLLC

(57) ABSTRACT

In order to solve at least one of the drawbacks that result from a state in which a plurality of secondary batteries are integrated, a battery apparatus having a plurality of flat secondary batteries 70 includes housing 1 with opening 30, and lid 31 capable of opening and closing opening 30 of housing 1, wherein the plurality of secondary batteries 70 are disposed in a vertical orientation in parallel with each other in housing 1 and are capable of being singly inserted into and taken out of housing 1 through opening 30.

4 Claims, 19 Drawing Sheets

(56) References Cited

FOREIGN PATENT DOCUMENTS

| JP | 2010-182541 A | 8/2010 |
| JP | 2011-210455 A | 10/2011 |
| JP | 2012-009311 A | 1/2012 |

* cited by examiner (a)

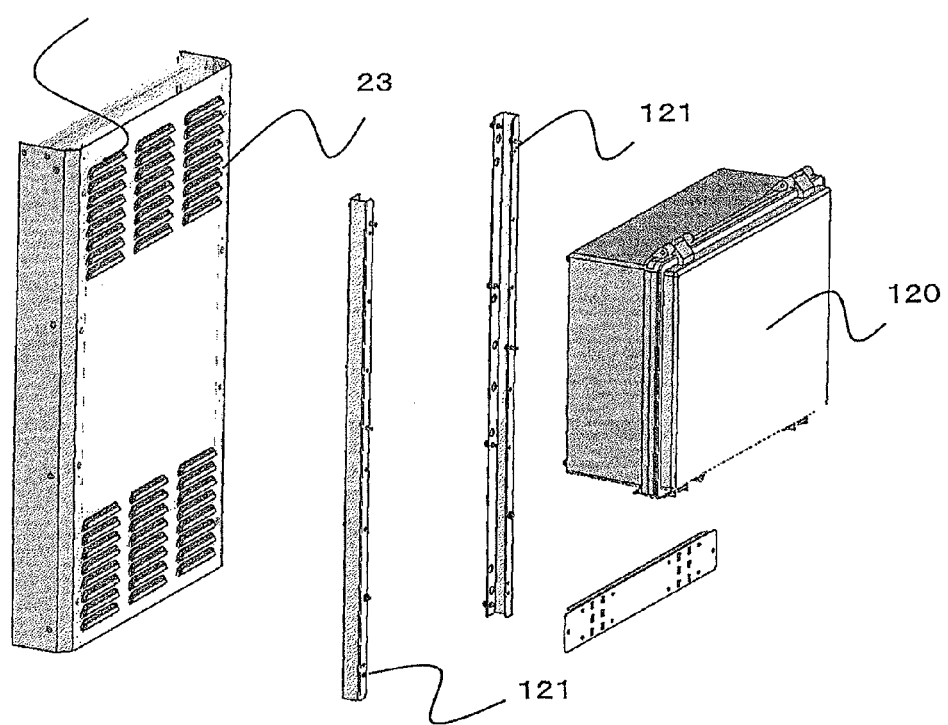

BATTERY APPARATUS

CROSS REFERENCE TO RELATED APPLICATIONS

This application is a National Stage of International Application No. PCT/JP2012/065487, filed on Jun. 18, 2012, which claims priority from Japanese Patent Application No. 2011-156889, filed on Jul. 15, 2011, the contents of all of which are incorporated herein by reference in their entirety.

TECHNICAL FIELD

The present invention relates to a battery apparatus having a plurality of secondary batteries.

BACKGROUND ART

A battery apparatus includes a plurality of secondary batteries and when necessary discharges electricity charged in the secondary batteries. For example, the battery apparatus discharges, in the daytime, electricity charged during nighttime when the power rates are low, or discharges, in the nighttime, electricity charged by solar power generation during the daytime. Also, the battery apparatus discharges, at the time of power stoppage, electricity charged before the power stoppage.

Conventionally, in ordinary cases, a battery apparatus such as described above is installed in a factory, a business company's office or the like. In recent years, such a battery apparatus has come to be installed in ordinary houses.

As secondary batteries, film-sheathed batteries are ordinarily provided in a battery apparatus. A film-sheathed battery includes battery elements: positive electrode plates and negative electrode plates alternately stacked via separators. These battery elements are enclosed together with an electrolyte in a sheath film such as a laminated film.

In Patent Literature 1, a battery apparatus including a lithium-ion battery as a film-sheathed battery is described. The battery apparatus described in Patent Literature 1 includes a casing in rectangular block form made of metal plates. The internal space of the casing is partitioned into left and right spaces by a wall. In the right space, a lithium-ion battery having a plurality of cells integrally packed in a box and a lithium-ion battery filling unit are disposed. In the left space, an alternate current power supply controller for supplying alternating current power from the lithium-ion battery is disposed.

CITATION LIST

Patent Literature

Patent Literature 1: JP2010-182541A (paragraphs 0013 and 0014)

SUMMARY OF INVENTION

Technical Problem

In the battery apparatus described in Patent Literature 1, a lithium-ion battery integrally constructed by packing a plurality of cells in a box is housed in a casing. In other words, a battery unit integrally constructed by packing a plurality of film-sheathed batteries in a box is housed in a casing. Therefore, it is not possible to insert or remove each individual film-sheathed battery into or from the casing. For this reason, it is necessary to insert the entire battery unit into the casing or to remove the entire battery unit from the casing when an installation operation or a maintenance/inspection operation after the installation operation is performed. Also, even in the case where some of the film-sheathed batteries are suspected of malfunctioning, it is necessary to take the entire battery unit out of the casing in order to check whether or not a malfunction has occurred. As clearly described in Patent Literature 1, however, the battery unit has a large weight, and inserting the battery unit into the casing or removing the battery unit from the casing requires a heavy effort. In some cases a plurality of workers are needed to perform this kind of insertion/removal operation. Furthermore, even if the malfunctioning film-sheathed battery is identified after taking the battery unit out of the casing, the film-sheathed battery alone cannot be replaced; the entire battery unit needs to be replaced.

An object of the present invention is to solve at least one of the above-described problems.

Solution to Problem

According to the present invention, a battery apparatus including a plurality of flat secondary batteries is provided, the apparatus including a housing with an opening, and a lid capable of opening and closing the opening of the housing, wherein the plurality of secondary batteries are disposed in a vertical orientation in parallel with each other in the housing and are capable of being singly inserted into and removed from the housing through the opening.

Advantageous Effects of Invention

According to the present invention, at least one of the above-described problems can be solved.

BRIEF DESCRIPTION OF DRAWINGS

FIG. 14B is an exploded perspective view showing the state in which the box is mounted.

REFERENCE SIGNS LIST

Figure 1A:
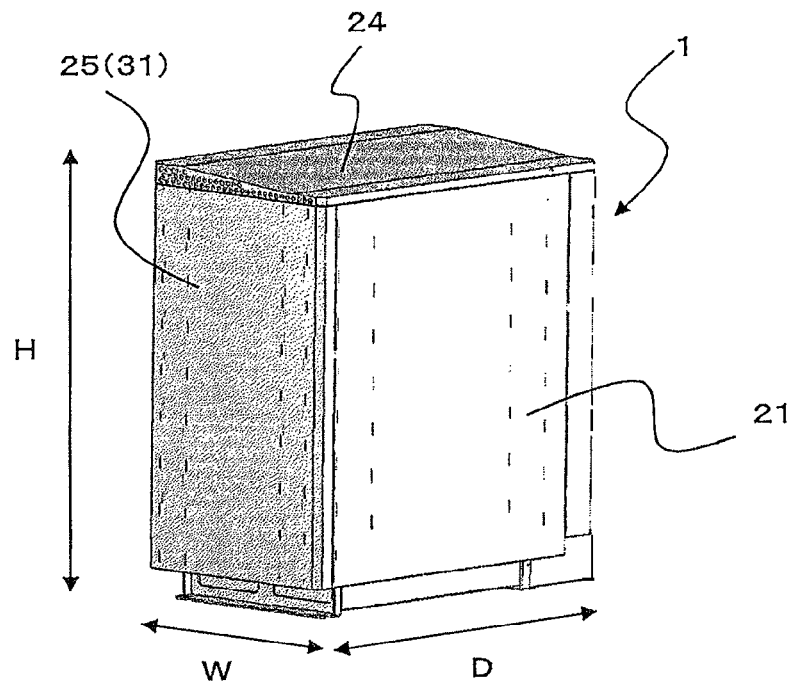
FIG. 1A is a front-side perspective view of a housing.

1 Housing
2 Inner housing
27 Space
28 Space
30 Opening
50 PCS unit
60 BMU
70 Battery pack
72 Film-sheathed battery
80 Upper plate
84 Rail member
85 Guide slot
90 Lower plate
94 Rail member
95 Guide slot

DESCRIPTION OF EMBODIMENT

Hereinafter, an example of a battery apparatus of the present invention in an exemplary embodiment will be described with reference to the drawings. The battery apparatus according to the exemplary embodiment comprises a metal housing, a plurality of secondary batteries, a battery management unit (BMU), a power conditioner system (PCS) unit and a control system.

The BMU intermediates between each secondary battery, the PCS unit and the control system, collects information about the condition of each secondary battery and determines the condition of each secondary battery based on the collected information. Furthermore, the BMU outputs information indicating the condition of each secondary battery to the PCS unit and the control system based on the results of the determination. The PCS unit converts an alternating current voltage supplied from an external power source (a commercial power source or a solar battery) into a direct current voltage and outputs the direct current voltage to each secondary battery. The PCS unit also converts a direct current voltage supplied from each secondary battery into an alternating current voltage and outputs the alternating current voltage to the outside (load). The control system mainly consists of an arithmetic processing unit, a memory and a program stored in the memory, and performs overall control of the battery apparatus. For example, the control system manages and controls transmission of information between the BMU and the PCS unit in accordance with the above-described program, manages and controls the amount of charge in and the amount of discharge from the secondary batteries, and changes the operation mode (charge mode, discharge mode) of the battery apparatus. In the battery apparatus according to the exemplary embodiment, the control system consists of a notebook-type personal computer (PC), a memory incorporated in the PC, a program stored in the memory, and so on. The main functions of the BMU, the PCS unit and the control system have been described. The BMU, the PCS unit and the control system also have functions other than the functions described above.

Figure 1B:
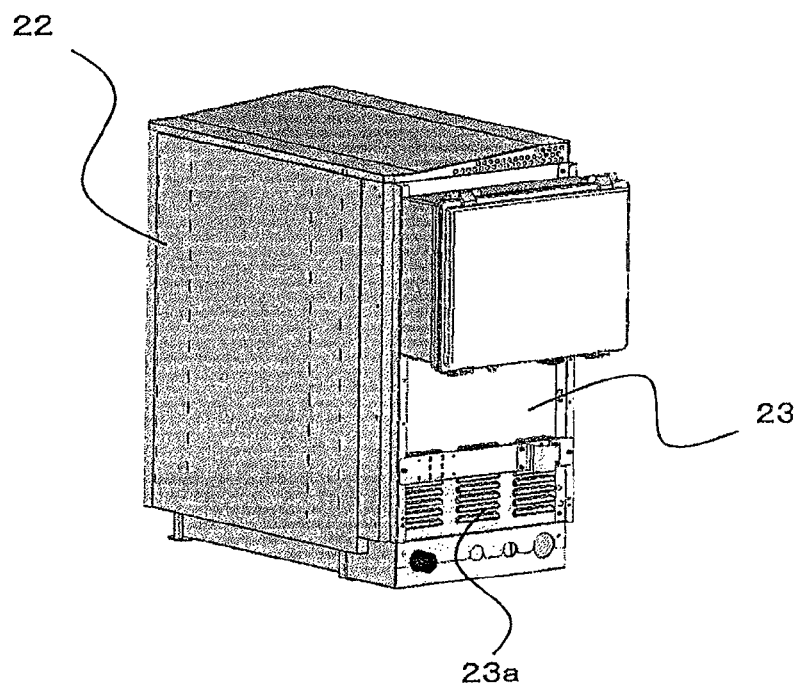
FIG. 1B is a back-side perspective view of the housing.
Figure 2:
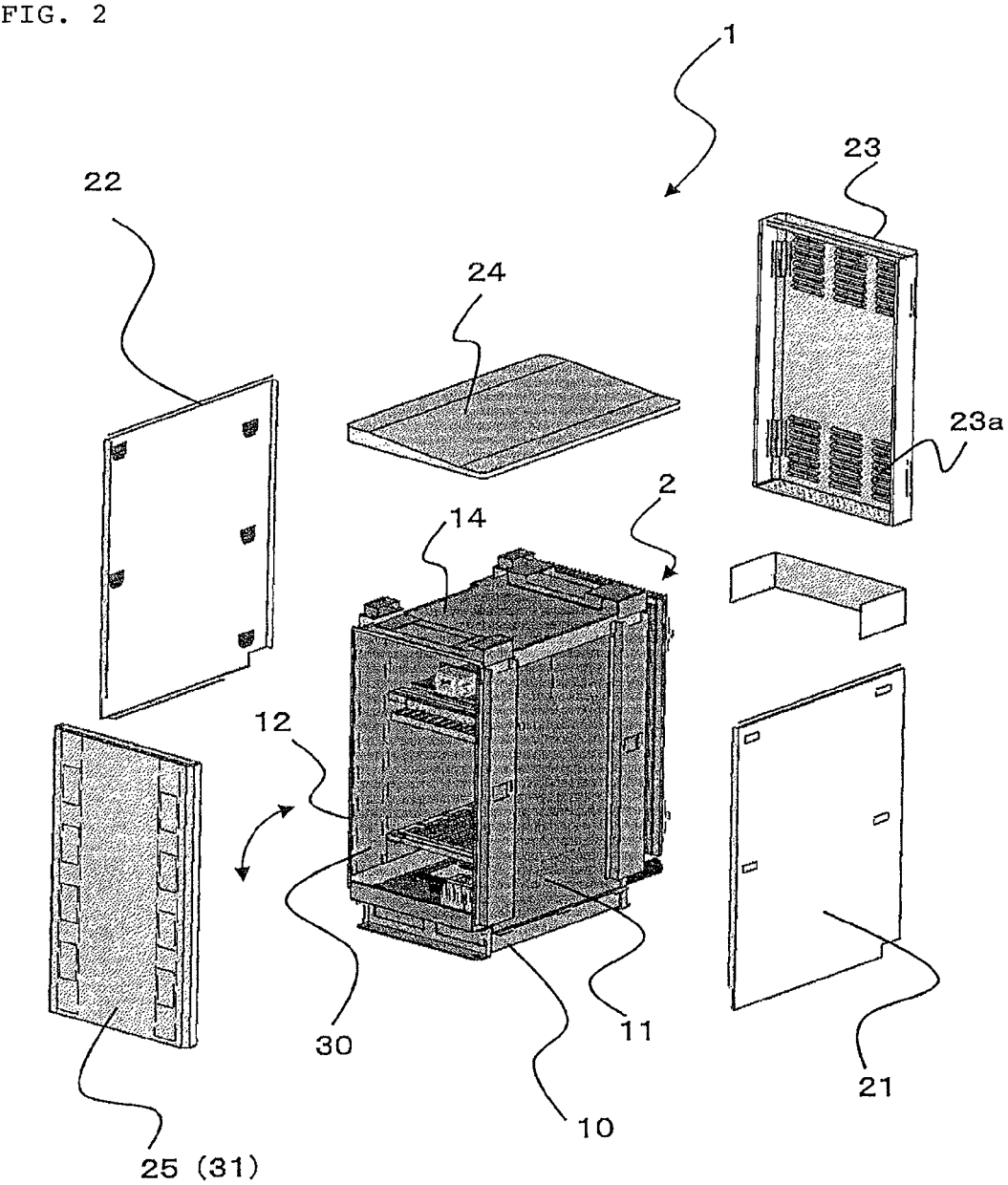
FIG. 2 is an exploded perspective view of the housing.

FIG. 1A is a front-side perspective view of housing 1. FIG. 1B is a back-side perspective view of housing 1. FIG. 2 is an exploded perspective view of housing 1. As shown in these figures, housing 1 is a box that mainly consists of inner housing 2 and outer panels covering inner housing 2 and has an appearance generally in rectangular block form as a whole. Inner housing 2 and the outer panels are made of metal, which is stainless steel in the exemplary embodiment. Although the size of housing 1 is not particularly specified, housing 1 in the exemplary embodiment has the following dimensions: a width (W) of 450 mm, a depth (D) of 760 mm and a height (H) of 880 mm (see FIG. 1A).

As shown in FIG. 2, inner housing 2 comprises base (bottom portion) 10 generally in rectangular form as viewed in plan, right side 11 and left side 12 rising upright from the two longer sides of base 10, back side 13 (FIG. 4B) rising upright from one of the shorter sides of base 10, and ceiling side 14 opposite to base 10, with the side (front side) opposite to back side 13 open. Reinforcing members are attached to the external sides of inner housing 2 as required.

Left and right sides 11, 12 of inner housing 2 are covered with side panels 21, 22, respectively. Also, back side 13 of inner housing 2 is covered with back panel 23, and ceiling side 14 is covered with ceiling panel 24. Furthermore, front panel 25 is provided at the front side of inner housing 2. The panels are fixed to each other or fixed on inner housing 2 by riveting or welding as required. However, only front panel 25 is rotatably attached to the front side of inner housing 2. That is, front panel 25 forms a lid 31 which opens or closes opening 30 of housing 1. Heat radiating members described below are disposed between back side 13 (FIG. 4B) of inner housing 2 and back panel 23. A plurality of slits 23a for making the heat radiating members communicate with the outside air are formed in back panel 23.

Figure 3:
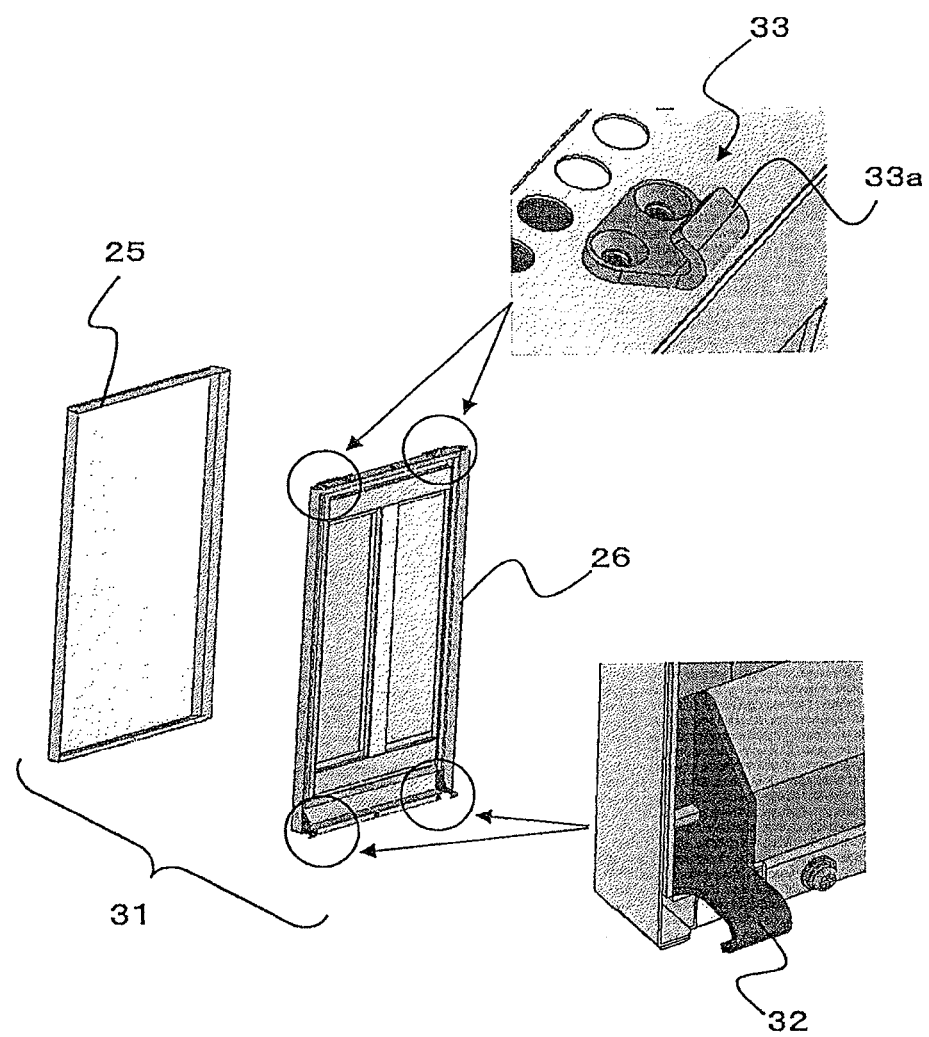
FIG. 3 is an exploded perspective view of a lid.

FIG. 3 is an exploded view showing lid 31 of housing 1 that mainly consists of front panel 25. Lid 31 consists of front panel 25 and frame panel 26 fitted inside front panel 25. Hooks 32 are each provided at both sides of the lower end of lid 31. Lock mechanisms 33 are each provided at both sides of the upper end of lid 31. Lid 31 is attached to housing 1 by making respective hooks 32 engage with a shaft (not shown) provided at the lower edge of housing opening 30 so as to be rotatable on the shaft in the direction of the arrow in FIG. 2. Lock mechanisms 33 in the exemplary embodiment are the so-called snap locks, and receiving portions 33a of the snap locks are provided at both sides of the upper end of lid 31. On the other hand, arms and levers (not shown) of the snap locks are provided at the upper edge of housing opening 30. The snap locks are locked by turning the levers in a predetermined direction in a state where the arms are hitched to receiving portions 33a, and are unlocked by turning the levers in the reverse direction. Lock mechanisms 33 are not limited to the snap locks, and any lock mechanism can be adopted.

Figure 4A:
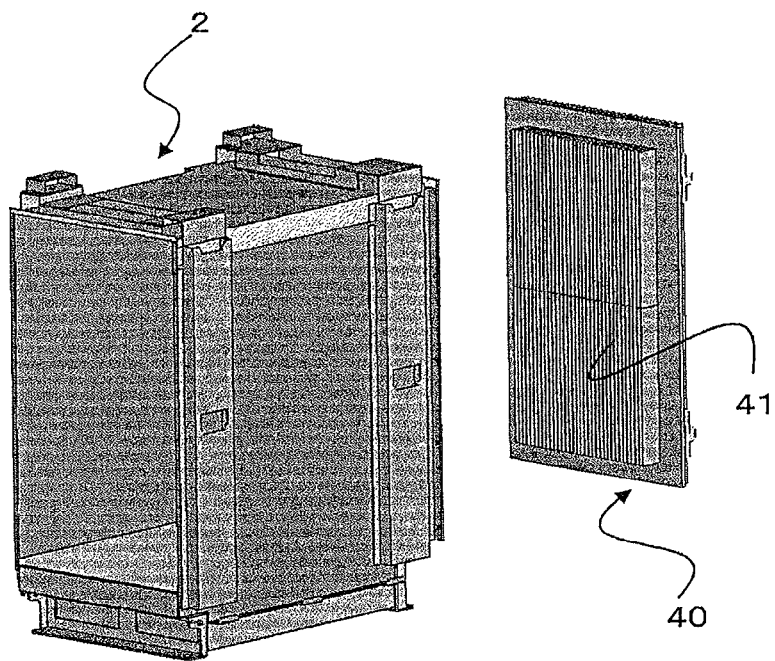
FIG. 4A is a front-side perspective view of an inner housing.
Figure 4B:
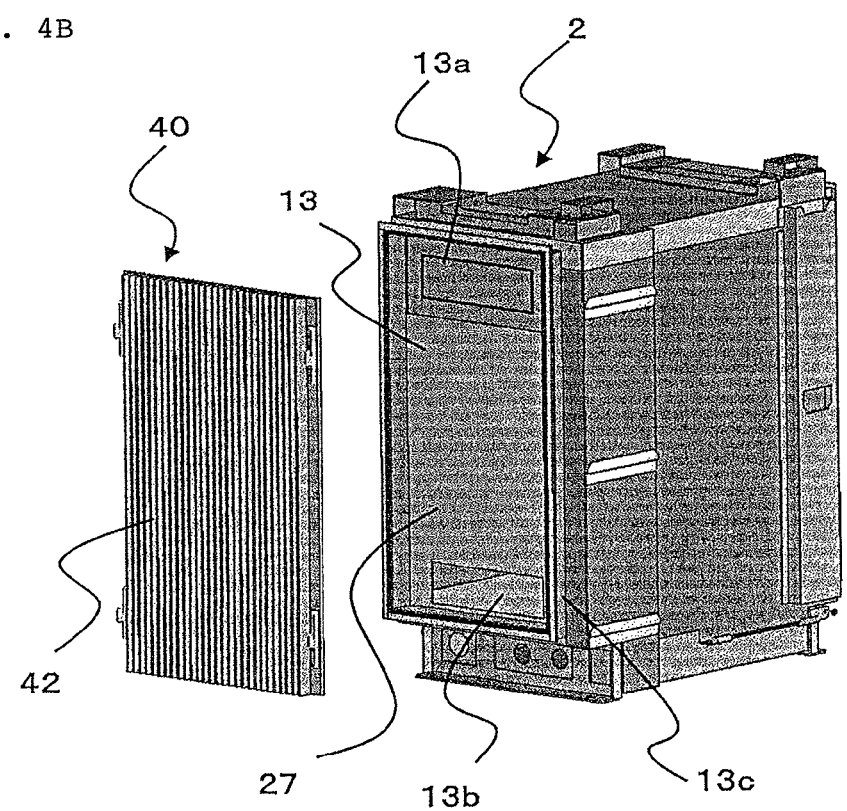
FIG. 4B is a back-side perspective view of the inner housing.

As shown in FIGS. 4A and 4B, openings (upper opening 13a, lower opening 13b) are provided at upper and lower sides on back side 13 of inner housing 2. Flange 13c having a height of about 40 mm is provided on the edges of back side 13. Heat radiating member 40 is housed inside flange 13c and is covered with back panel 23 (FIG. 2). In other words, heat radiating member 40 is disposed in space 27 provided between back side 13 of inner housing 2 and back panel 23. In further other words, the internal space of housing 1 is partitioned into an inner space and space 27 in inner housing 2 by a partition wall (back side 13 of inner housing 2), and the inner space and space 27 in inner housing 2 are connected to each other via two openings 13*a*, 13*b*.

Heat radiating member 40 includes heat absorbing side 41 and heat radiating side 42 on which a multiplicity of fins are formed, and is disposed in such an orientation that heat absorbing side 41 is opposite to back side 13. Also, the outer peripheral surface of heat radiating member 40 is in close contact with the inner peripheral surface of flange 13*c*. Furthermore, rubber packing 41 is provided between the end surface of flange 13*c* and back panel 23 to secure predetermined airtightness and watertightness.

Figure 5:
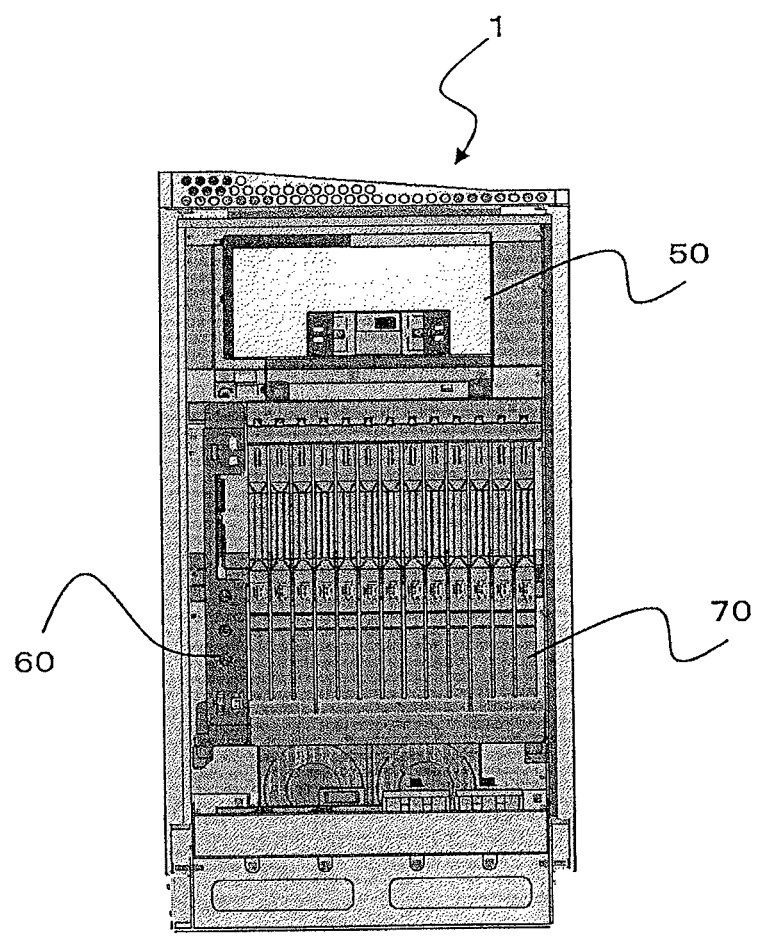
FIG. 5 is a front view showing the interior of the housing.

FIG. 5 is a front view of housing 1 in a state where lid 31 is removed. The internal space of housing 1, or more strictly the inner space in inner housing 2, is partitioned into three spaces along the top-bottom direction. PCS unit 50 is housed on the upper stage, BMU 60 and a plurality (thirteen in the exemplary embodiment) of battery packs 70 are housed on the intermediate stage, and a terminal base (not shown) is housed on the lower stage. The internal structure of housing 1, i.e., the internal structure of the battery apparatus according to the exemplary embodiment, will be concretely described below with reference to FIGS. 6A to 13.

Figure 6A:
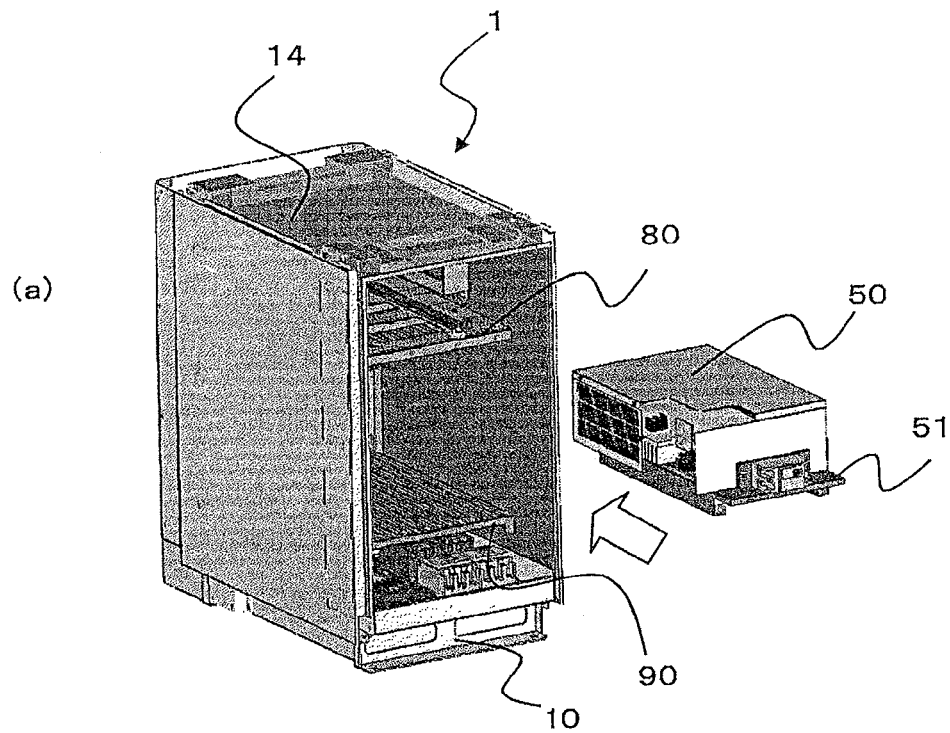
FIG. 6A is a perspective view showing a state before an operation to insert a PCS unit is performed.

The internal space of housing 1 is partitioned into three spaces by a pair of members in plate form (upper plate 80, lower plate 90), as shown in FIG. 6A. More specifically, the internal space is partitioned into a space between upper plate 80 and ceiling side 14 of inner housing 2 (first space), a space between upper plate 80 and lower plate 90 (second space) and a space between lower plate 90 and base 10 (third space).

Figure 6B:
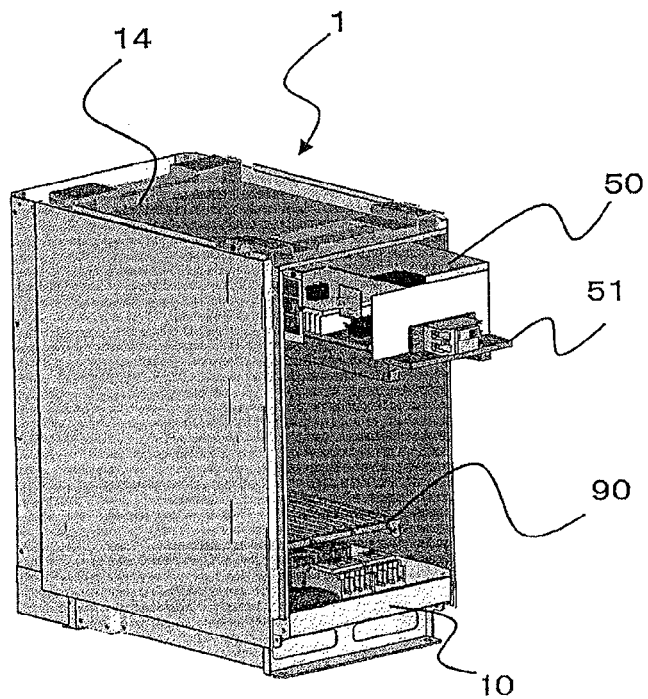
FIG. 6B is a perspective view showing a state when the operation to insert the PCS unit is temporarily stopped.

PCS unit 50 is housed in the first space in a state of being fixed on chassis 51. When PCS unit 50 is housed in the first space, chassis 51 on which PCS unit 50 is fixed is inserted into the first space by being slid along the upper surface of upper plate 80, as shown in FIG. 6A. This inserting operation is temporarily stopped before PSC unit 50 is completely inserted in the first space, and necessary cables are connected to PCS unit 50, as shown in FIG. 6B. Thereafter, PSC unit 50 is completely inserted in the first space and chassis 51 is fixed to upper plate 80 with screws.

Figure 7A:
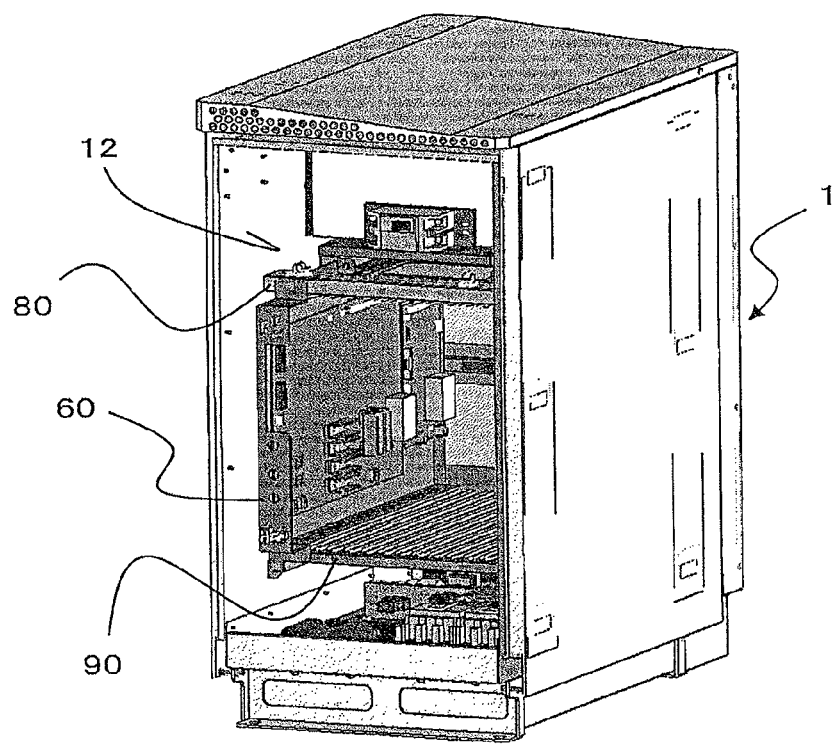
FIG. 7A is a perspective view showing a state after housing a BMU.
Figure 8A:
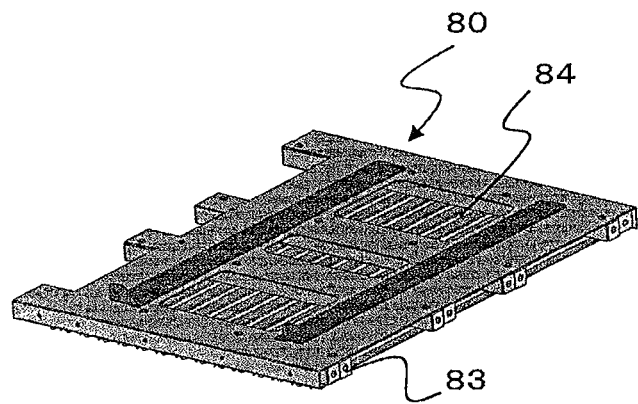
FIG. 8A is an upper-side perspective view of an upper plate.
Figure 8B:
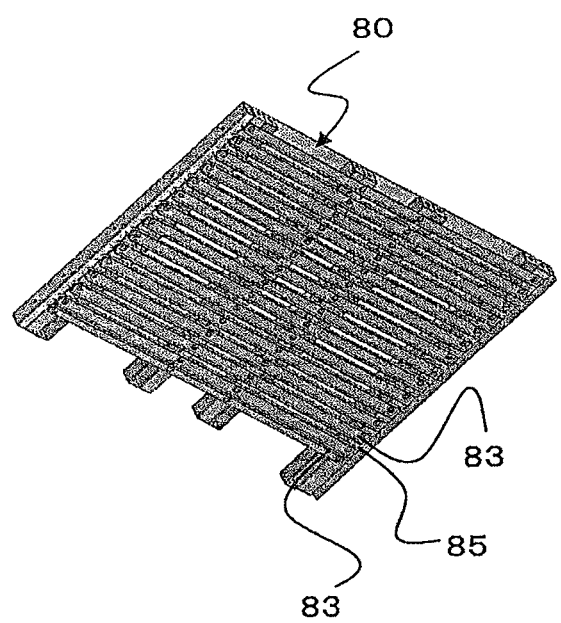
FIG. 8B is a lower-side perspective view of the upper plate.
Figure 8C:
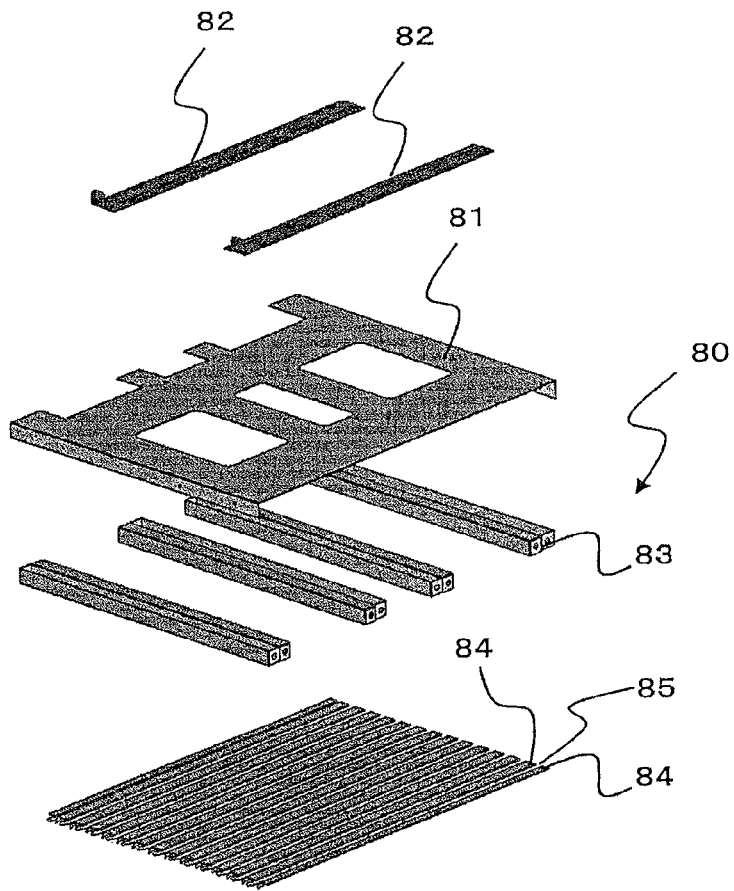
FIG. 8C is an exploded perspective view of the upper plate.
Figure 9A:
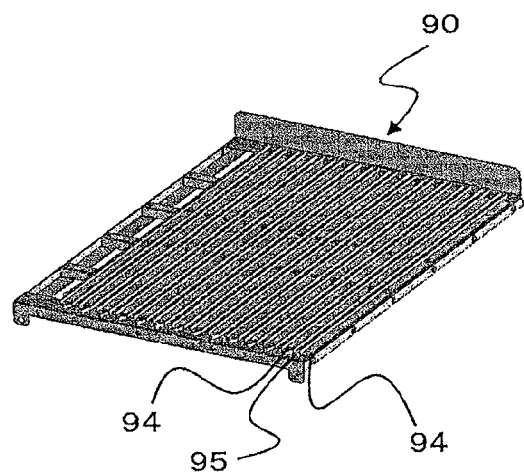
FIG. 9A is an upper-side perspective view of a lower plate.
Figure 9B:
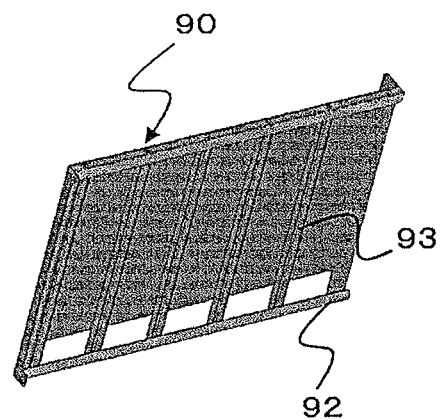
FIG. 9B is a lower-side perspective view of the lower plate.

As shown in FIG. 7A, BMU 60 is housed in the second space. Description of the structures of upper plate 80 and lower plate 90 will be preliminarily made with reference to FIGS. 8A to 9C. FIG. 8A is an upper-side perspective view of upper plate 80; FIG. 8B is a lower-side perspective view of upper plate 80; and FIG. 8C is an exploded perspective view of upper plate 80. Also, FIG. 9A is an upper-side perspective view of lower plate 90; FIG. 9B is a lower-side perspective view of lower plate 90; and FIG. 9C is an exploded perspective view of lower plate 90.

As most clearly shown in FIG. 8C, upper plate 80 consists of base plate 81, a pair of brackets 82 provided on the upper surface of base plate 81, a plurality of supporting members 83 provided on the lower surface of base plate 81 and a plurality of rail members 84 spanned on supporting members 83. Each bracket 82 has its one longitudinal-direction end bent upward, and a screw hole (not shown) is formed in the bent end portion. A screw for fixing chassis 51 (FIGS. 6A and 6B) to upper plate 80 on which PCS unit 50 is mounted is screwed into the screw hole. On the other hand, on the lower surface of base plate 81, a plurality of supporting members 83 are arranged at a predetermined interval in parallel with each other. Furthermore, on supporting members 83, a plurality of rail members 84 are arranged at a predetermined interval along the longitudinal direction of supporting members 83 in parallel with each other. Each rail member 84 has a generally U-shaped sectional shape, and guide slots 85 are formed between side walls of adjacent rail members 84. That is, thirteen guide slots 85 are provided in parallel with each other on the lower surface of upper plate 80 opposite to the upper surface of lower plate 90.

Figure 9C:
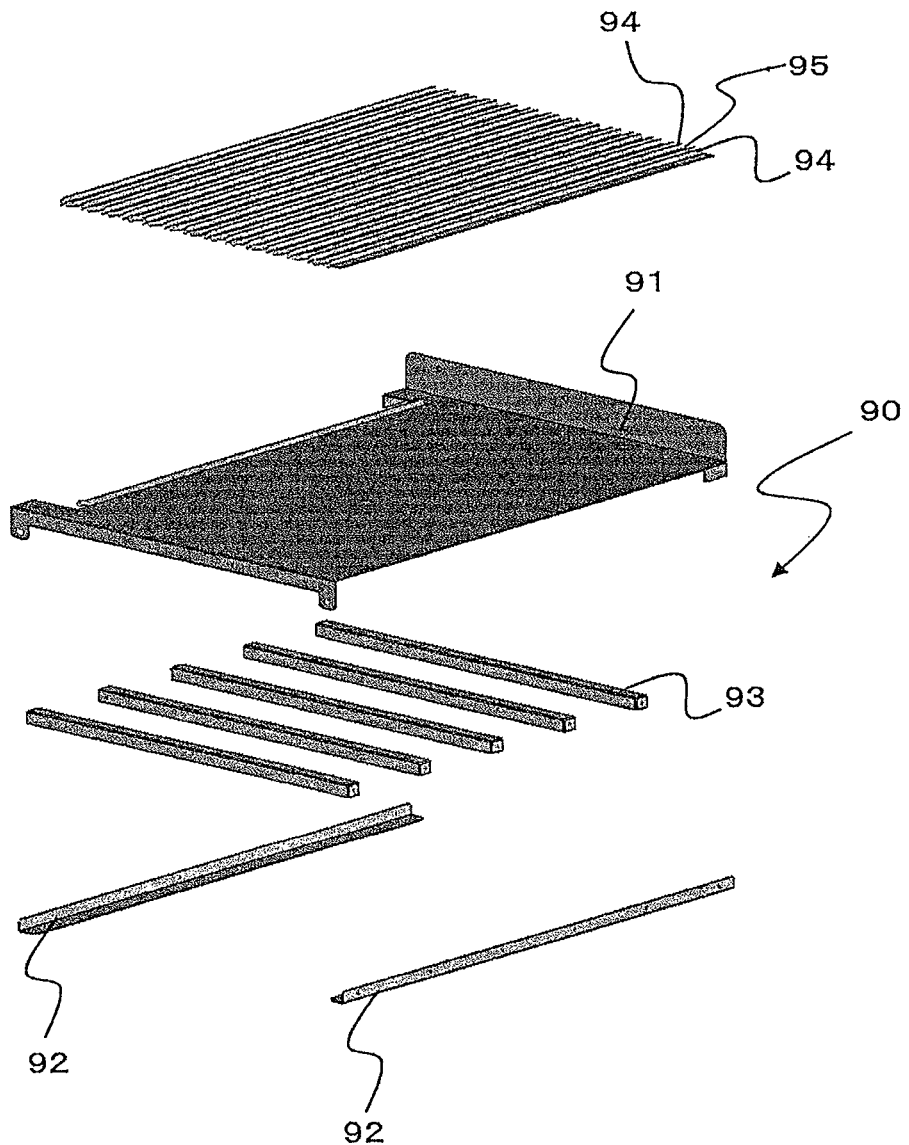
FIG. 9C is an exploded perspective view of the lower plate.

As most clearly shown in FIG. 9C, lower plate 90 consists of base plate 91, a pair of brackets 92 provided on the lower surface of base plate 91, a plurality of supporting members 93 spanned between the pair of brackets 92 and a plurality of rail members 94 provided on the upper surface of base plate 81. Between brackets 92 that are opposite to each other, a plurality of supporting members 93 are arranged at a predetermined interval along the longitudinal direction of these brackets 92 in parallel with each other. On the other hand, on the upper surface of base plate 91, a plurality of rail members 94 are arranged at a predetermined interval along the longitudinal direction of supporting members 93 in parallel with each other. Each rail member 94 has a generally U-shaped sectional shape. Guide slots 95 are formed between side walls of adjacent rail members 94. That is, thirteen guide slots 95 are provided in parallel with each other on the upper surface of lower plate 90 that is opposite to the lower surface of upper plate 80. Guide slots 85 provided in upper plate 80 and guide slots 95 provided in lower plate 90 correspond to each other in a one-to-one relationship. Each of rail members 84, 94 has its side wall end portions bent inwardly, such that the width of the end portion (entry/exit portion) of each of guide slots 85, 95 is slightly larger than the width of the other portion.

Figure 7B:
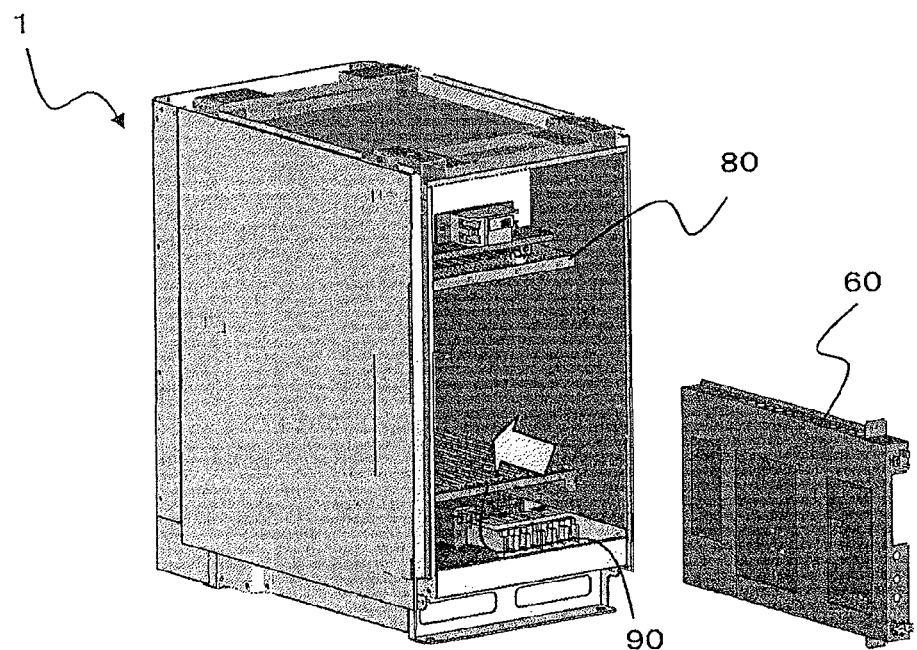
FIG. 7B is a perspective view showing a state before housing the BMU.

Reference is again made to FIGS. 7A and 7B. BMU 60 is inserted into the second space along left side 12 of inner housing 2, as shown in FIGS. 7A and 7B. As shown in FIG. 7A, BMU 60 inserted in the second space is fixed to the end surfaces of upper plate 80 and lower plate 90 with screws not shown in the figure.

Figure 10:
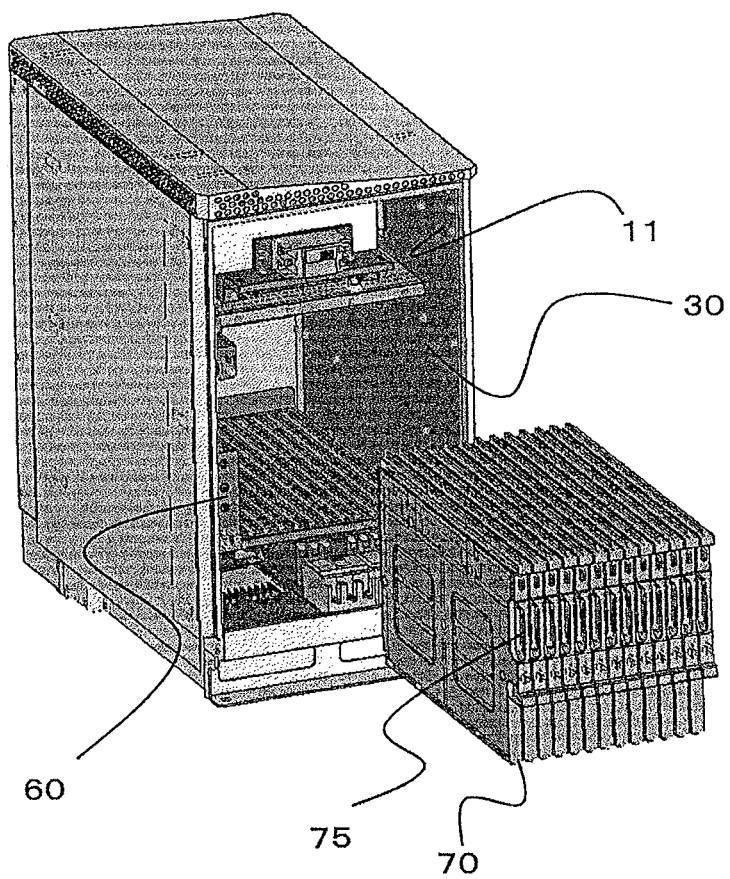
FIG. 10 is a perspective view showing a state before battery packs are housed.
Figure 11:
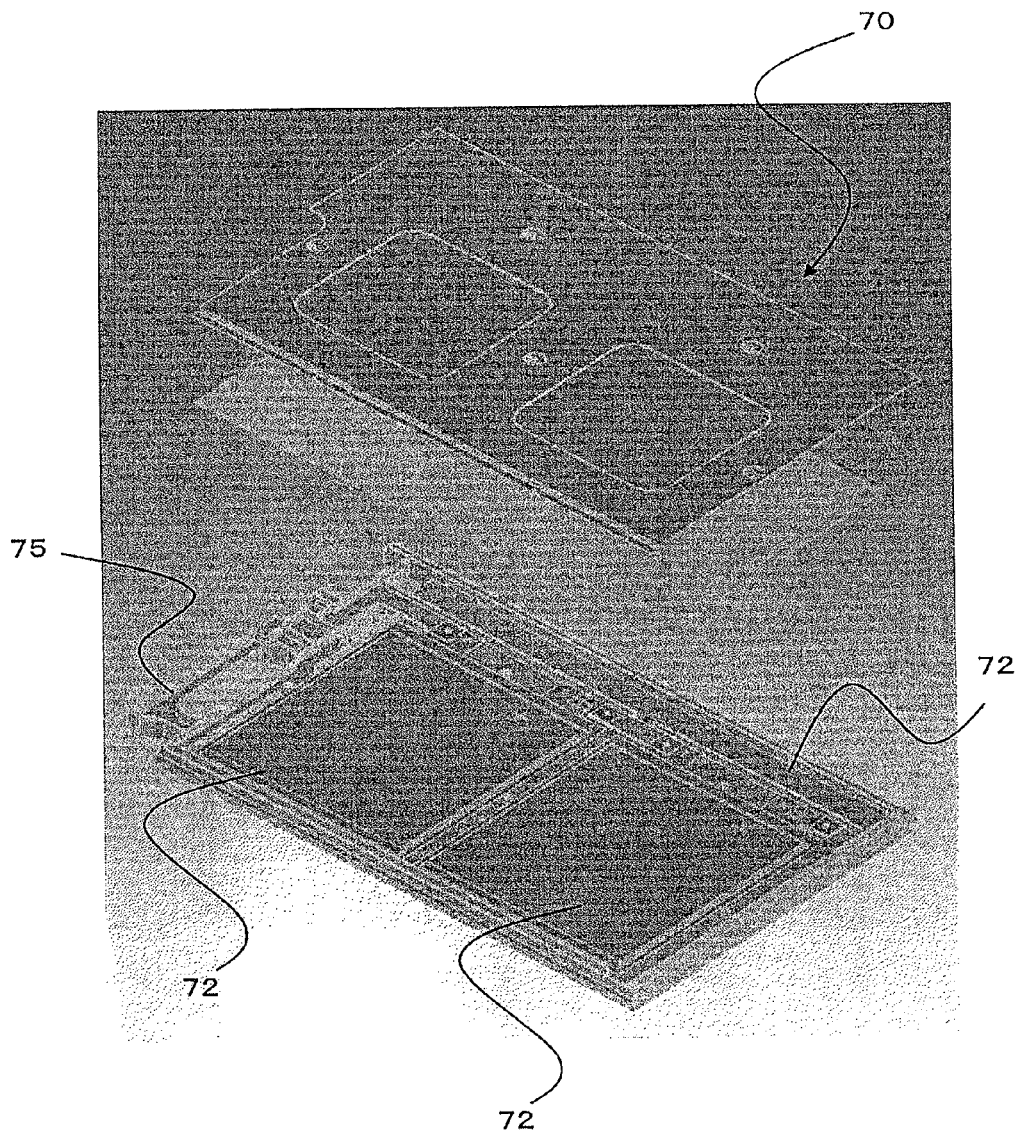
FIG. 11 is an exploded perspective view of the battery pack.

As shown in FIGS. 5 and 10, a plurality of secondary batteries (a plurality of battery packs 70 in the exemplary embodiment) are housed adjacent to BMU 60 in the second space. In other words, a plurality of battery packs 70 are housed between BMU 60 and right side 11 of inner housing 2. As shown in FIG. 11, each battery pack 70 includes module case 71 generally in plate form, and film-sheathed batteries (lithium-ion batteries) 72 are disposed in recesses formed on two major sides (side A, side B) of module case 71. More specifically, two of the above-described recesses are formed on each of the major sides of module case 71, and one film-sheathed battery 72 is disposed in each recess. While only two film-sheathed batteries 72 disposed on one major side (side A) of module case 71 are illustrated in FIG. 11, two film-sheathed batteries are also disposed in the same way on the other major side (side B) of module case 71. In short, each battery pack 70 includes four film-sheathed batteries 72, which are connected in series by connection members (bus bars) provided in case 71. The secondary battery used in the battery apparatus of the present invention is not limited to the above-described battery pack.

As shown in FIG. 11, two film-sheathed batteries 72 disposed on each of the major sides of module case 71 are covered with insulating sheet 73 large enough to collectively cover these film-sheathed batteries 72, and insulating sheet 73 is covered with cover 74. Also, handle 75 is integrally formed on an end surface of module case 71.

Reference is again made to FIG. 10. In the battery apparatus according to the exemplary embodiment, a plurality of battery packs 70 are disposed in parallel with each other in a vertical orientation. In other words, a plurality of battery packs 70 are disposed in parallel with each other in the second space so that side A and side B of adjacent battery packs 70 (module case 71) are opposite to each other. In further other words, battery packs 70 are disposed in parallel with each other in inner housing 2 in such an orientation that their major sides are parallel to sides 11, 12 (FIG. 2) of inner housing 2. Also, end surfaces on which handles 75 are provided of battery packs 70 disposed in parallel with each other as described above are opposite to the opening face of housing opening 30. That is, handles 75 are exposed in housing opening 30. By disposing a plurality of battery packs 70 in a vertical orientation in parallel with each other as described above, the effect of the weight of the other battery packs 70 on each battery pack 70 can be avoided. On the other hand, in the case where a plurality of film-sheathed batteries are stacked one on another by being horizontally laid, there is a risk of a warp or the like of each film-sheathed battery as a result of the action thereon of the weights of the batteries on the higher stages.

The upper ends (upper edges) of battery packs 70 disposed in parallel with each other as described above are inserted in guide slots 85 through their entire length, while the lower ends (lower edges) are inserted in guide slots 95 through their entire length. In short, slots in which battery packs 70 can be inserted and from which battery packs 70 can be removed are provided in housing 1. Each of the end portions (entry/exit portions) of guide slots 85 and 95 is slightly larger in width than the other portion. Therefore the end portions of battery packs 70 can be easily inserted into guide slots 85 and 95 through the end portions of guide slots 85 and 95. While a plurality of battery packs 70 are shown integrally with each other in FIG. 10, battery packs 70 are independent of each other and each battery pack 70 alone can be inserted into and taken out of housing 1.

Figure 12A:
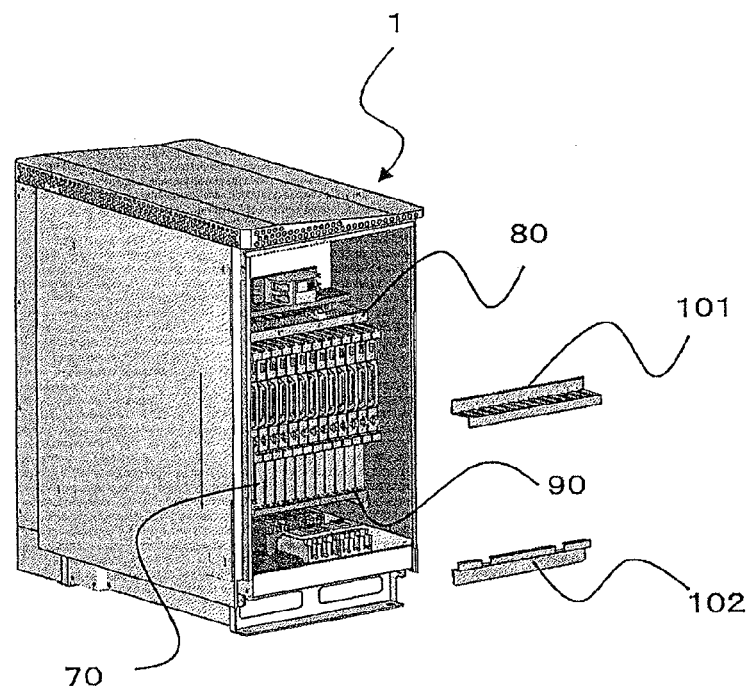
FIG. 12A is a perspective view showing a state after housing the battery packs.
Figure 12B:
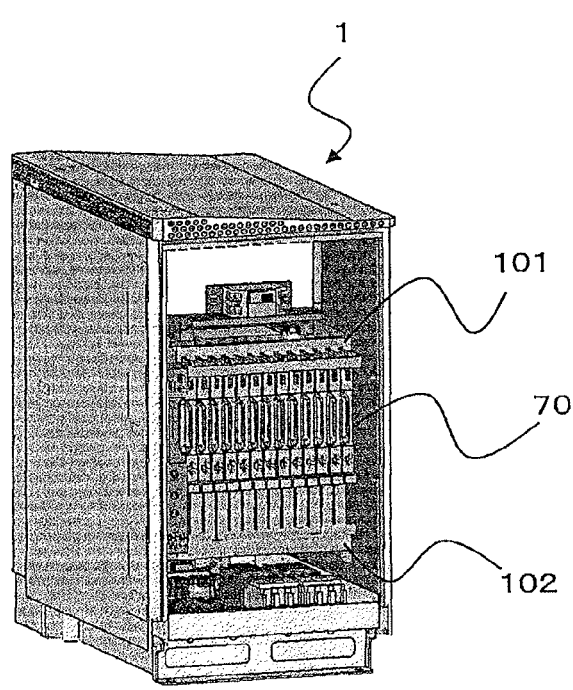
FIG. 12B is a perspective view showing a state after housing the battery packs.

As shown in FIGS. 12A and 12B, a plurality of battery packs 70 housed in housing 1 are integrally fixed in housing 1 by a pair of fixing members 101, 102. More specifically, upper fixing member 101 straddling upper portions of the end surfaces of battery packs 70 and the end surface of upper plate 80 adjacent to the upper portions of the end surfaces of battery packs 70 is screw fastened to the end surface of upper plate 80. Also, lower fixing member 102 straddling lower portions of the end surfaces of battery packs 70 and the end surface of lower plate 90 adjacent to the lower portions of the end surfaces of battery packs 70 is screw fastened to the end surface of lower plate 90. By these two fixing members 101, 102, battery packs 70 are fixed in the front-rear direction (housing 1 insertion/removal direction). It is obvious that battery packs 70 are fixed in the left-right direction by the side walls of rail members 84 and 94 forming guide slots 85, 95.

Figure 13:
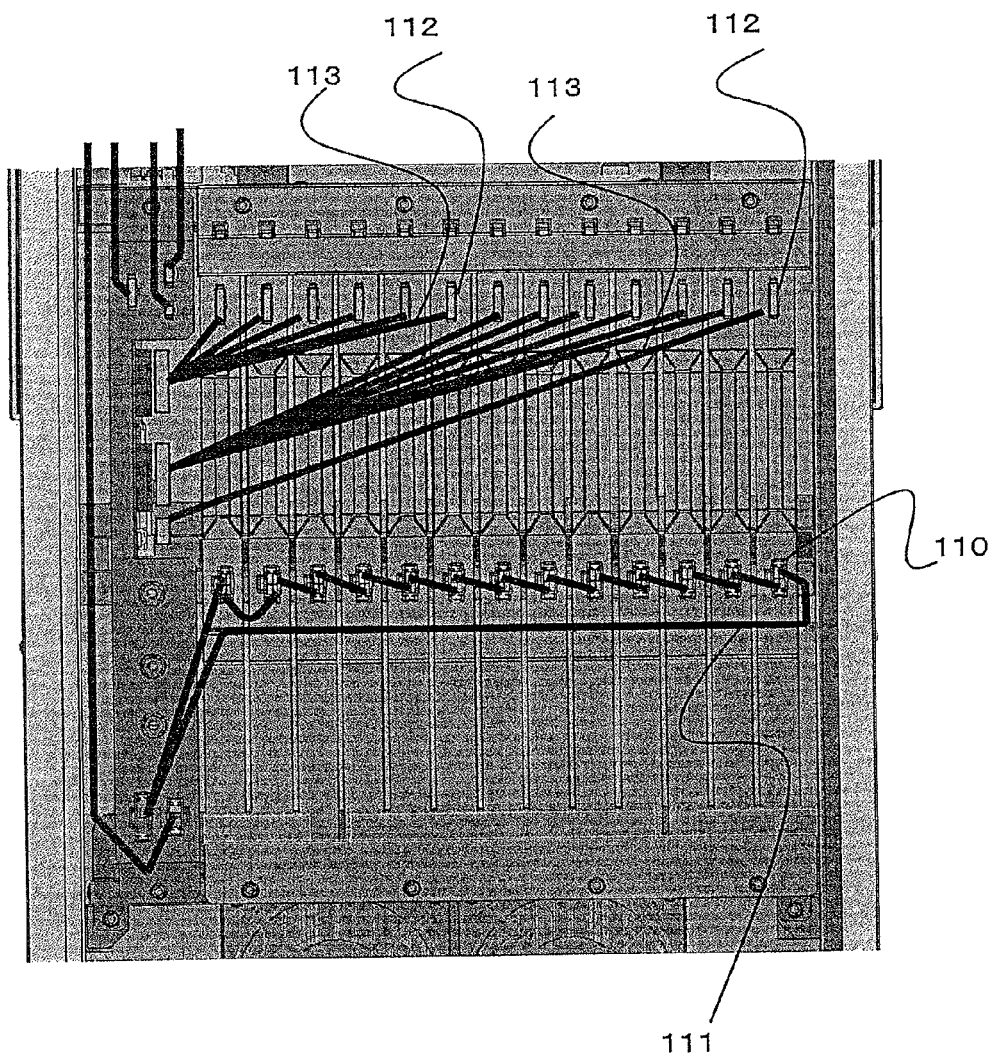
FIG. 13 is a partial enlarged front view showing a state in which the battery packs are housed.

As shown in FIG. 13, a plurality of battery packs 70 housed in housing 1 are connected in series by power cable 111 that connects connectors 110 provided on the end surfaces of battery packs 70 to each other and are connected to BMU 60 by this power cable. Four film-sheathed batteries 72 connected in series are housed in each battery pack 70, as already described. Thus, the battery apparatus according to the exemplary embodiment includes fifty-two (4×13) film-sheathed batteries 72 connected in series and has a maximum capacity of 6 kwh.

As shown in FIG. 13, connectors 112 other than connectors 110 are provided on the end surfaces of battery packs 70. Connectors 112 on six of battery packs 70 are each connected to connector 114 of BMU 60 via signal cables 113, while connectors 112 on the other seven battery packs 70 are each connected to connector 115 of BMU 60 via signal cables 113. These connectors and cables are for sensing the conditions of battery packs 70, and information indicating the conditions of battery packs 70 is input to BMU 60 through these connectors and cables.

Figure 14A:
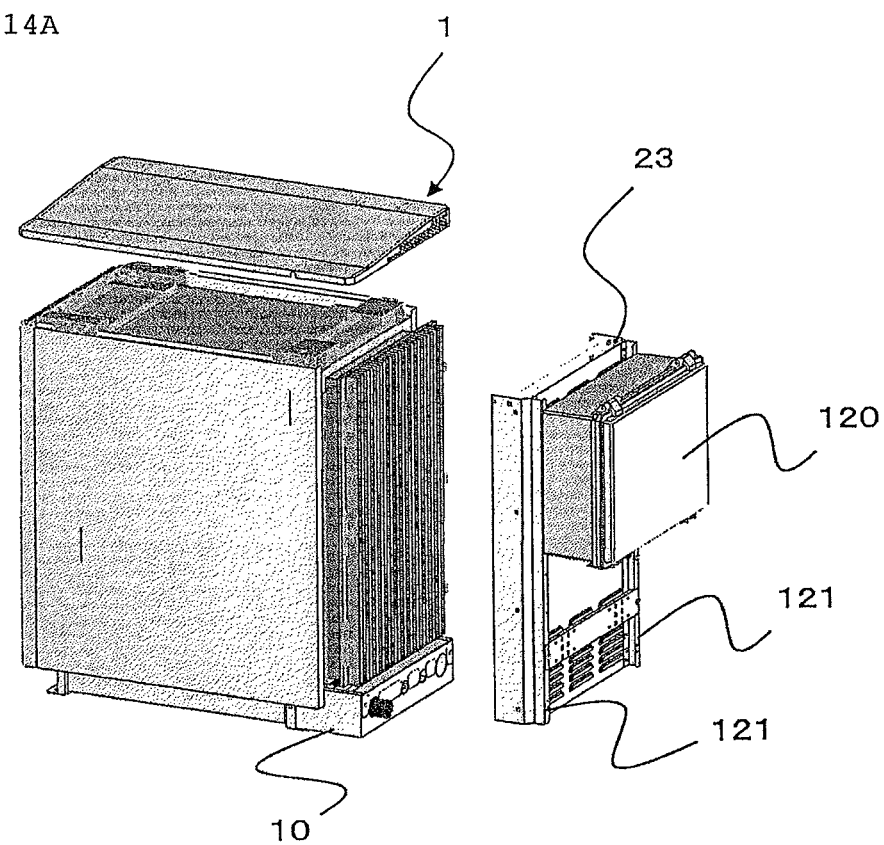
FIG. 14A is a perspective view showing a state in which a box is mounted.

As shown in FIGS. 14A and 14B, box 120 is mounted outside back panel 23, and a notebook-type PC constituting the control system is housed in this box 120. More specifically, a pair of brackets 121 are screw fastened to the outer surface of back panel 23, and box 120 is screw fastened to these brackets 121. Brackets 121 have a function to form a gap between back panel 23 and box 120 such that slits 23*a* that are formed on back panel 23 are not closed by box 120 as well as the function to fix box 120 on back panel 23.

As shown in FIG. 14A, a lead-in hole for leading in a cable and a lead-out hole for leading out a cable are provided in the back side of base 10. The cable led in through the lead-in hole is connected to a predetermined terminal provided on the above-mentioned terminal base. Also, a cable connected to a predetermined terminal provided on the above-mentioned terminal base is lead out to the outside through the lead-out hole.

A cooling structure for the battery apparatus according to the exemplary embodiment will next be described. The performance of each film-sheathed battery housed in housing 1 changes depending on the ambient temperature. It is, therefore, desirable to maintain the temperature in housing 1 within a predetermined temperature range. In consideration of this, making the internal space of housing 1 communicate with the outside air can limit the increase in temperature in the internal space. However, if an opening or a through hole for communication between the internal space of housing 1 and the outside air is provided, there is concern that rain water or dust may penetrate to the inside via the opening or through hole. Therefore, housing 1 constituting the battery apparatus according to the exemplary embodiment is provided in such a structure so as to be hermetically closed when opening 30 is closed by lid 31, thereby securing predetermined airtightness and watertightness. In other words, no opening or through hole for communication between the internal space of housing 1 and the outside air is provided. Slits 23*a* (FIG. 1B, FIG. 2) provided in back panel 23 communicate with space 27 in which heat radiating member 40 is disposed. Also, as shown in FIG. 4B, openings 13*a* and 13*b* are provided on back side 13 of inner housing 2 in which space 27 is formed. However, heat radiating member 40 is disposed by being superposed on back side 13 and the outer peripheral surface of heat radiating member 40 is in close contact with the inner peripheral surface of flange 13*c*. Also, packing 41 is disposed between the end surface of flange 13*c* and back panel 23. That is, the internal space of housing 1 communicates with heat radiating member 40 but does not communicate with the outside air. More specifically, heat absorbing side 41 (FIG. 4A) of heat radiating member 40 communicates with the internal space of housing 1 through openings 13*a* and 13*b*, while heat radiating side 42 (FIG. 4B) communicates with outside air through slits 23*a*. This structure enables dissipating heat in housing 1 to the outside without communication between the internal space of housing 1 and the outside air.

Figure 15:
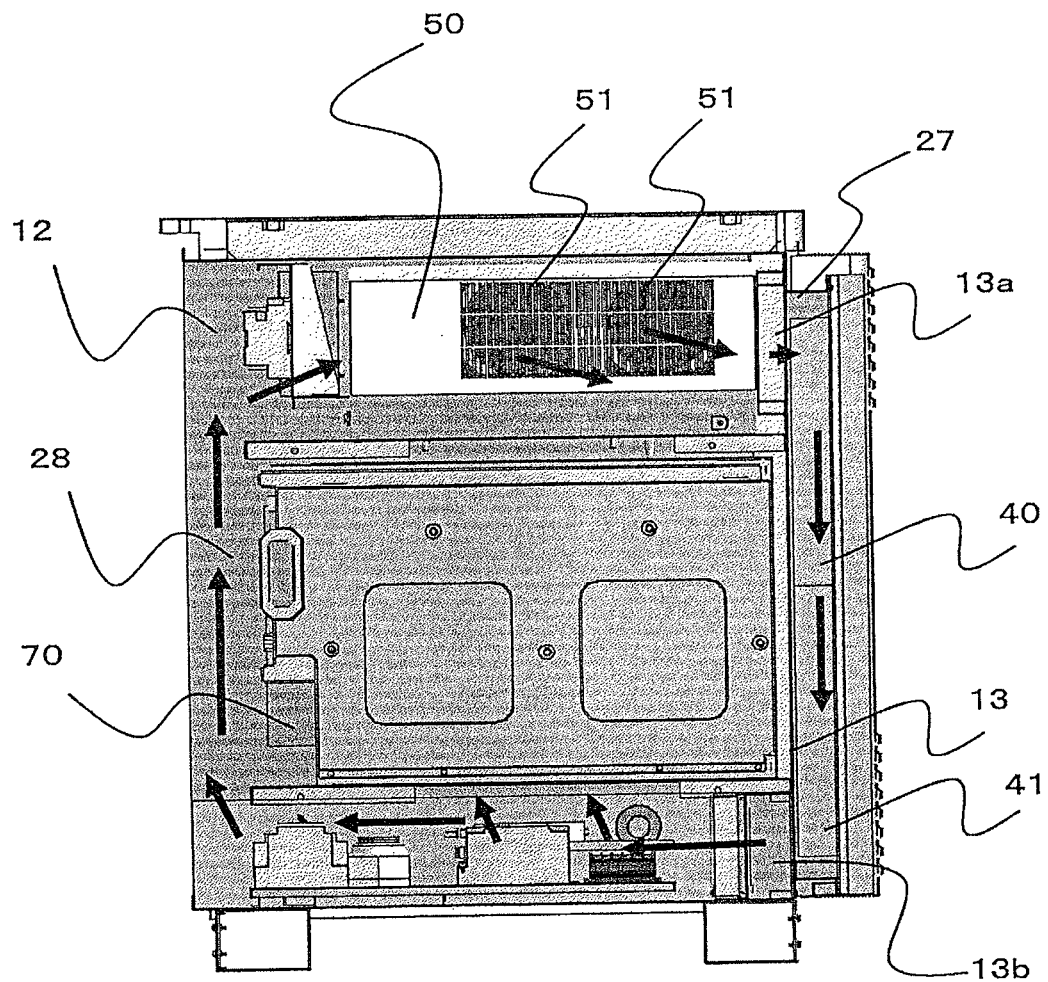
FIG. 15 is a transparent view schematically showing the flow of air in the housing.
Figure 16:
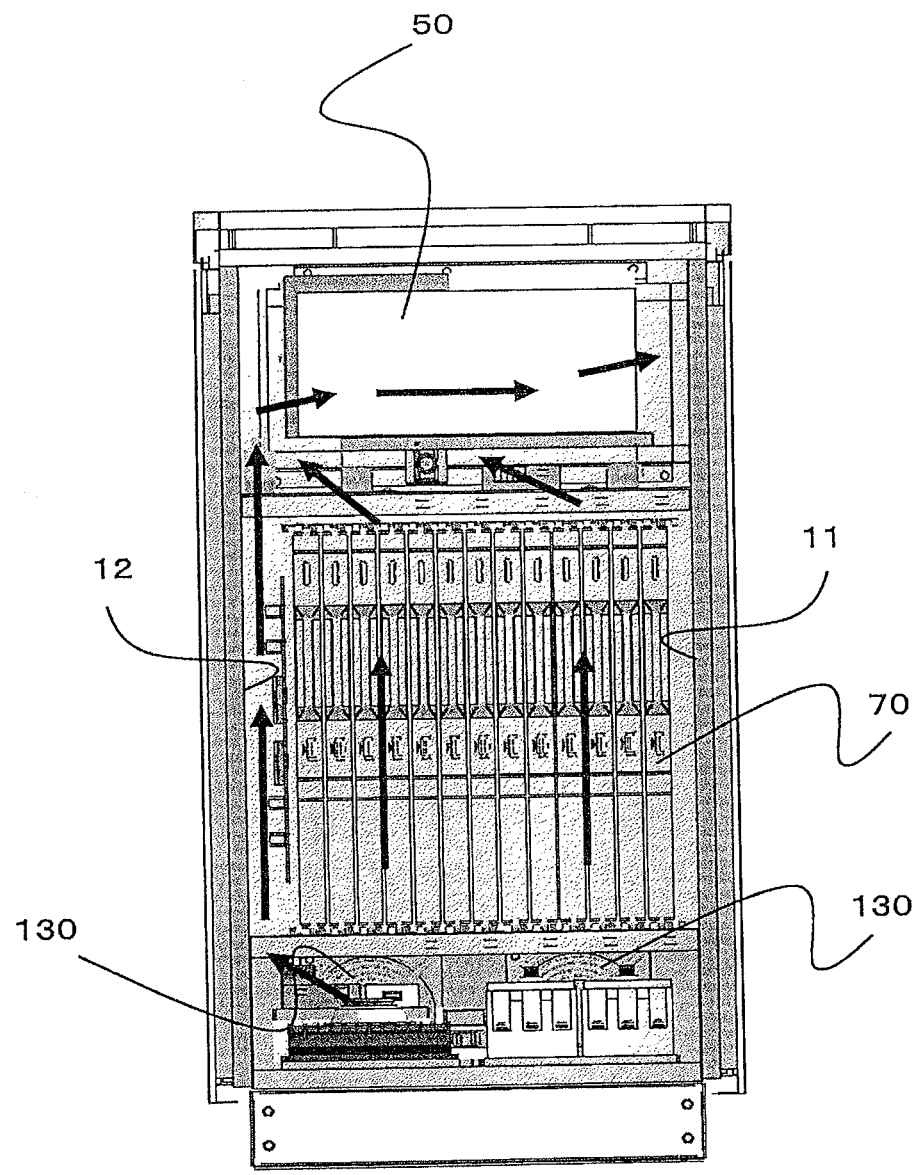
FIG. 16 is a transparent view schematically showing the flow of air in the housing.

Furthermore, an airflow that is created in housing 1, as schematically shown by using arrows in FIGS. 15 and 16, so that heat can be radiated through heat radiating member 40, is promoted. A concrete description of this will be given below.

FIG. 15 is a right-side transparent view of the battery apparatus according to the exemplary embodiment, and FIG. 16 is a front-side transparent view of the battery apparatus. As shown in FIG. 15, an air inlet (not shown) and air outlet 52 are provided on the case of PCS unit 50, and a cooling fan (not shown) is incorporated in the case. Accordingly, when this fan is rotated, air is introduced through the air inlet and the introduced air is discharged through air outlet 52. As shown in FIG. 15, the first space in housing 1 in which PCS unit 50 is housed communicates with space 27 in which heat radiating member 40 is housed through upper opening 13a. Also, the third space in housing 1 in which the terminal base is housed communicates with space 27 through lower opening 13b. Furthermore, as shown in FIG. 16, two fans 130 are provided in the vicinity of lower opening 13b in the third space in housing 1. That is, each of the upper and lower sections of the internal space of housing 1 communicates with space 27 and fans are provided in each of the upper and lower sections. Therefore, when the two fans (the fan incorporated in PCS unit 50 and fans 130) are rotated, airflows such as indicated by arrows in FIGS. 15 and 16 are generated in housing 1 according to the push-pull principle. More specifically, air blown out from air outlet 52 of PCS unit 50 flows into space 27 via upper opening 13a. The air having flowed into space 27 passes through space 27 and is drawn into fans 130 via lower opening 13b. Also, air blown out from fans 130 passes below electric packs 70 and flows out into space 28 between the end surfaces of electric packs 70 and front panel 25 (lid 31). Furthermore, the air having flowed into space 28 passes through space 28 to be drawn into the air inlet of PCS unit unit 50. That is, an airflow that circulates around battery packs 70 is formed in the internal space of housing 1.

When an airflow (air) circulating as described above passes (descends) through space 27, it is cooled by heat exchange with the outside air through heat radiating member 40. The cooled air cools battery packs 70 by heat exchange with the battery packs 70 mainly in the process of passing (ascending) through space 28. That is, spaces 27, 28 form passages for circulating air (cooling wind) in housing 1. In other words, back side 13 of inner housing 2 and heat absorbing side 41 of heat radiating member 40 that is opposite to back side 13 form a first passage therebetween. Also, the end surfaces of battery packs 70 and the inner surface of housing 1 (the inner surface of lid 31) that is opposite to the end surfaces form a second passage therebetween.

By forming an airflow as described above in housing 1, the plurality of battery packs 70 can be cooled more uniformly in comparison with the case of locally cooling by directly supplying cooling wind to battery packs 70.

In the exemplary embodiment, the fan incorporated in PCS unit 50 is used to form the above-described airflow. In the case where an electronic device incorporating a fan is housed as well as PCS unit 50, however, the fan incorporated in the electronic device may also be used. Furthermore, a fan different from that incorporated in the electronic device may be provided to be used. Air outlet 52 of PCS unit 50 and upper opening 13a may be connected by a duct. A temperature sensor may be provided and one or both of the above-described two fans may be controlled based on the detection result from this sensor. For example, a temperature sensor may be provided in the housing and the operations of the above-described two fans may be controlled based on the internal temperature in housing 1 that is detected by this sensor. Also, a temperature sensor may be provided outside the housing and the operations of the above-described two sensors may be controlled based on the environmental temperature that is detected by this sensor.

The present invention has been described with reference to the exemplary embodiment. However, the invention of the present application is not limited to the above-described exemplary embodiment. Various changes understandable by those skilled in the art within the scope of the invention of the present application can be made in the constitution and details of the invention of the present application.

This application is based upon and claims the benefit of priority from the prior Japanese Application No. 2011-156889, filed on Jul. 15, 2011, the entire contents of which are incorporated herein by reference.

The invention claimed is:

1. A battery apparatus having a plurality of flat secondary batteries, the apparatus comprising:
   a housing with an opening;
   a lid capable of opening and closing the opening of said housing;
   first guide slots each receiving a first end portion of one of the secondary batteries;
   second guide slots each receiving a second end portion of one of the secondary batteries opposite to the first end portion;
   a first member in plate form provided in said housing; and
   a second member in plate form provided in said housing, the second member in plate form being opposite to said first member in plate form,
   wherein a plurality of secondary batteries are disposed in a vertical orientation in parallel with each other in said housing and are capable of being singly inserted into or removed from said housing through the opening;
   wherein each secondary battery can be inserted into or removed from said housing along said first guide slot and said second guide slot,
   wherein said first guide slots are provided in a lower surface of said first member in plate form opposite to said second member in plate form,
   wherein said second guide slots are provided in an upper surface of said second member in plate form opposite to said first member in plate form,
   wherein a plurality of rail members are arranged at a predetermined interval on the lower surface of said first member in plate form to form said first guide slots between the rail members that are adjacent, and
   wherein a plurality of rail members are arranged at a predetermined interval on the upper surface of said second member in plate form to form said second guide slots between the rail members that are adjacent.

2. The battery apparatus according to claim 1, further comprising a plurality of guide slots provided in said housing and each receiving an end portion of one of the secondary batteries, wherein each secondary battery can be inserted into or removed from said housing along said guide slot.

3. The battery apparatus according to claim 1, wherein a PCS unit is disposed on said first member in plate form, and
   wherein a battery control unit is disposed between said first member in plate form and said second member in plate form and adjacent to the secondary battery at one end in the direction of disposition.

4. The battery apparatus according to claim 1, wherein said secondary battery is a battery pack containing a plurality of film-sheathed batteries.

* * * * *